United States Patent [19]

Klein

[11] Patent Number: 5,644,477

[45] Date of Patent: Jul. 1, 1997

[54] FRAME CARRIER AND MODULAR COVER PANEL SYSTEM

[75] Inventor: Peter P. Klein, Phoenixville, Pa.

[73] Assignee: Unisys Corporation, Blue Bell, Pa.

[21] Appl. No.: 326,266

[22] Filed: Oct. 20, 1994

[51] Int. Cl.⁶ .................................................. H02B 1/01
[52] U.S. Cl. ........................ 361/829; 361/752; 361/796; 211/41.1
[58] Field of Search ............................. 361/829, 752, 361/796, 797, 802, 728; 174/17 R; 211/41; 312/265.4–265.6

[56] References Cited

U.S. PATENT DOCUMENTS

| | | | |
|---|---|---|---|
| 3,035,446 | 5/1962 | Ross | 73/432 |
| 3,915,530 | 10/1975 | Anderson et al. | 312/257 R |
| 4,079,838 | 3/1978 | Granum | 211/26 |
| 4,497,411 | 2/1985 | DeBortoli | 211/26 |
| 4,700,275 | 10/1987 | Wood | 361/393 |
| 4,928,450 | 5/1990 | Rutledge | 52/202 |
| 4,986,499 | 1/1991 | Ponticelli | 248/27.1 |
| 5,164,886 | 11/1992 | Chang | 361/390 |
| 5,235,493 | 8/1993 | Yu | 361/685 |
| 5,269,598 | 12/1993 | Liu | 312/223.2 |
| 5,285,355 | 2/1994 | Chabert et al. | 361/784 |
| 5,327,683 | 7/1994 | Chu | 49/463 |

*Primary Examiner*—Leo P. Picard
*Assistant Examiner*—Y. Whang
*Attorney, Agent, or Firm*—John B. Sowell; Mark T. Starr; John F. O'Rourke

[57] ABSTRACT

Modular fascia cover assemblies for rack mounted equipment are disclosed. In a system comprised of several pieces of equipment mounted in a standardized rack, vertical spaces typically exist between the components. These spaces can be filled with fascia cover assemblies, and the present invention provides a modular system that permits openings of nearly any width to be filled. The fascia cover assembly is created by choosing a combination from a few standardized modular parts. The fascia cover assemblies disclosed preferably include components such as an operator panel and pull bar that can be included, respectively, at the top and bottom of the assembly. Most preferably, the operator panel is one and one-half units high and the pull bar is one-half unit high. A cover panel that is one unit high is also included. In certain embodiments, a larger cover panel component is also provided that is three units high. The modular panels are assembled on to a frame carrier that is preferably stamped from sheet metal to permit easy and inexpensive fabrication in any number of sizes. In preferred embodiments, the frame carrier and assembled panels are mounted to a rack using spring clips that are attached to the frame carrier.

19 Claims, 3 Drawing Sheets

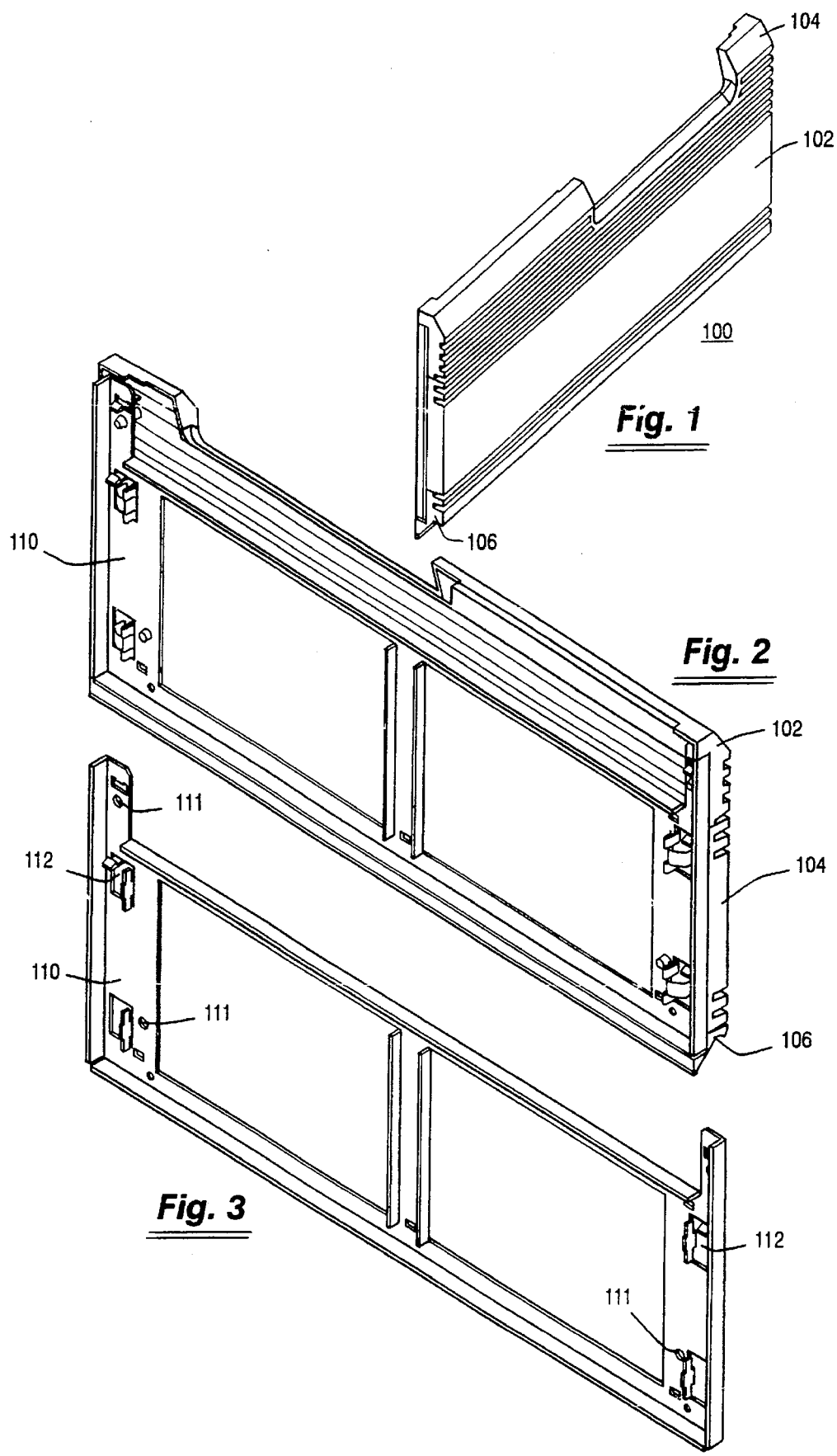

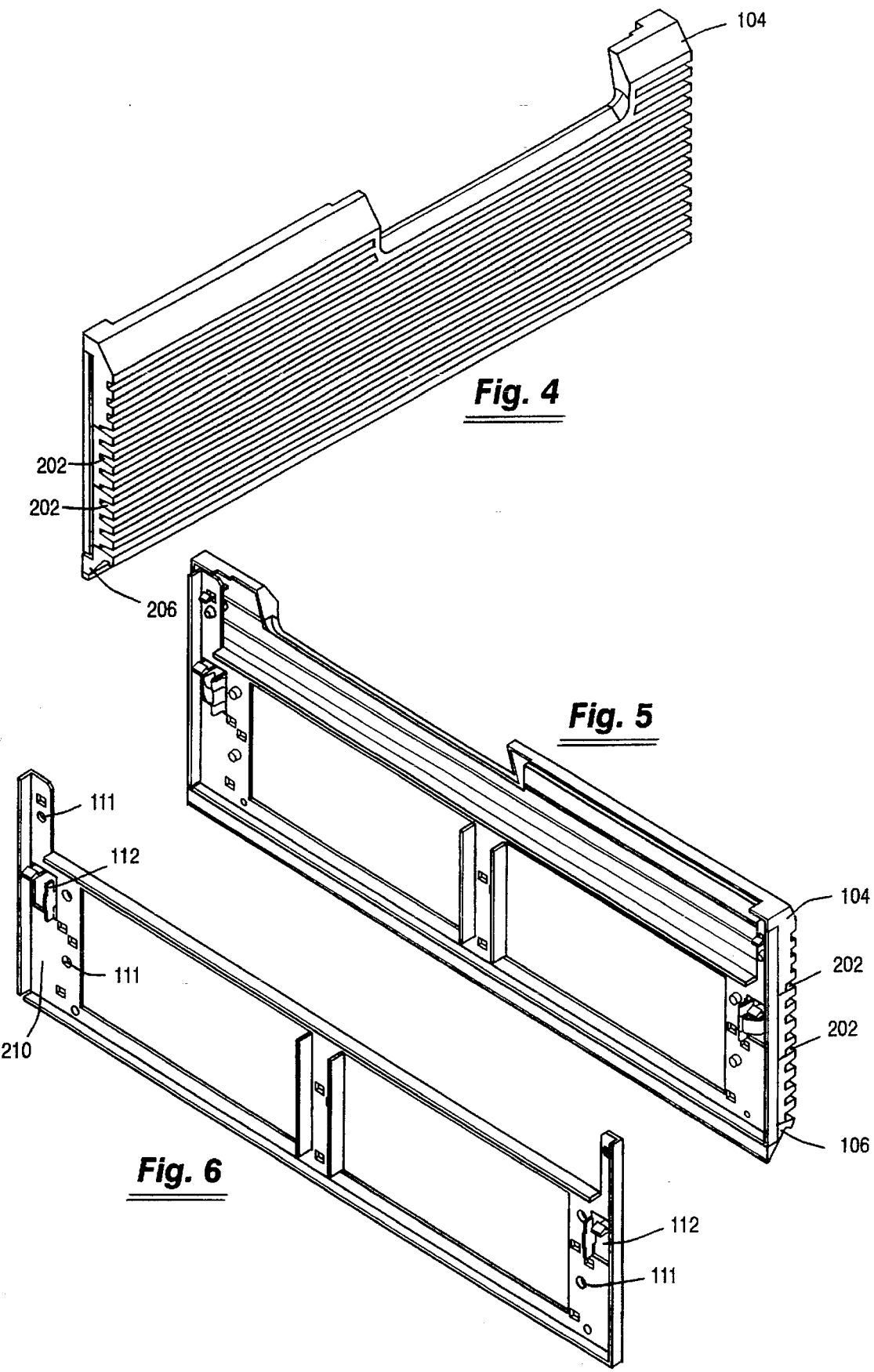

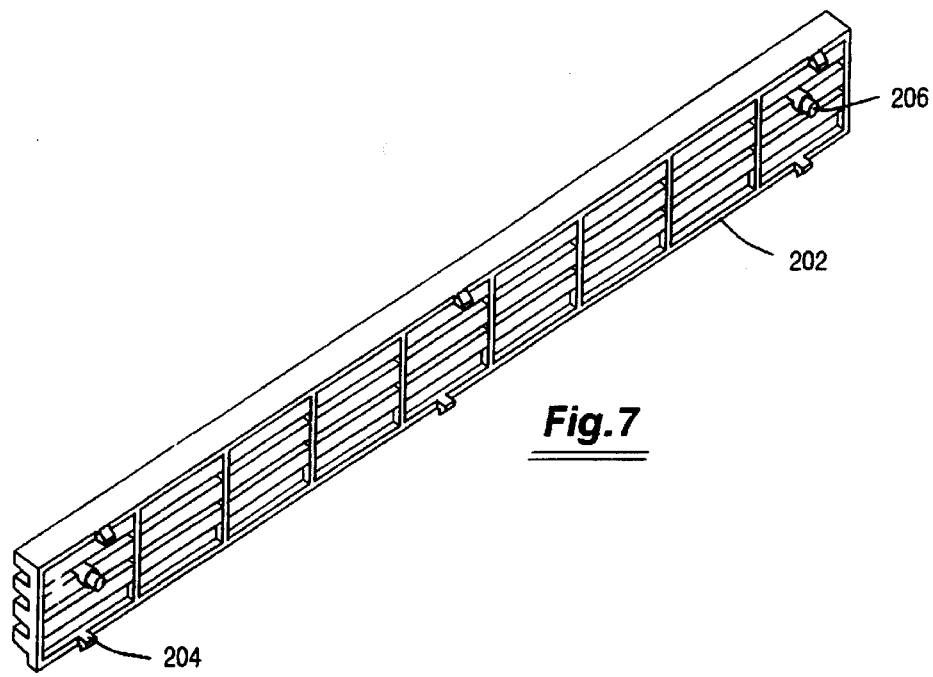
Fig.7
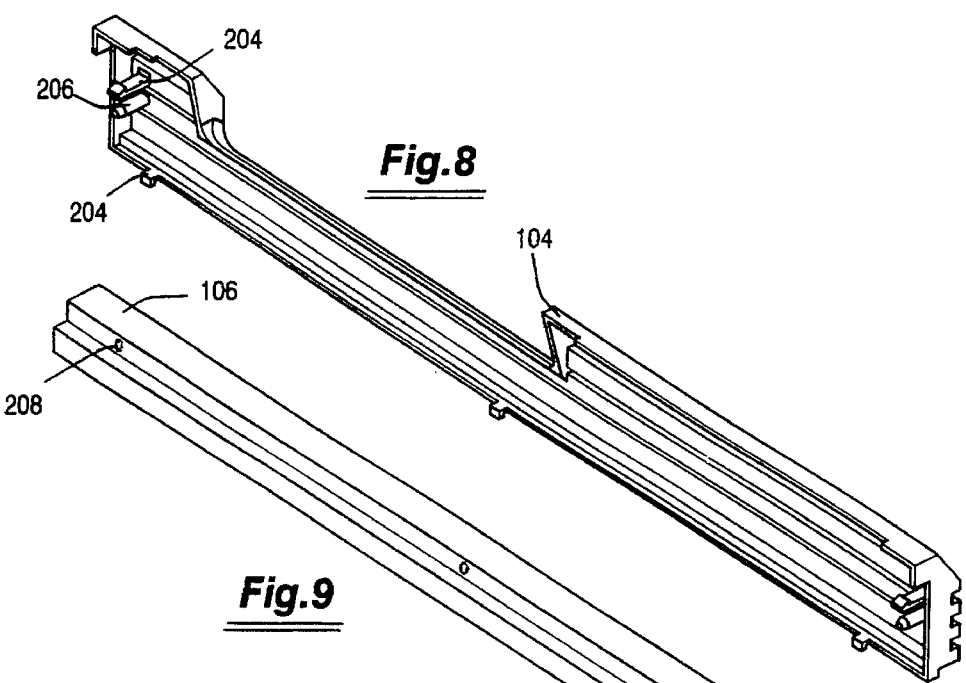
Fig.8
Fig.9
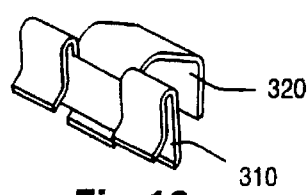
Fig.10
Fig.11

FRAME CARRIER AND MODULAR COVER PANEL SYSTEM

The present invention relates to housings for electronic equipment and the like, and more particularly, the present invention relates to fascia covers for rack-mounted equipment.

BACKGROUND OF THE INVENTION

A product line in the computer and electronics industry is generally defined by a wide array of products that can be integrated to form a system. In many instances, the various components that comprise a given system are mounted in one or more racks that have a standardized vertical spacing, although the number of standardized units between the components varies widely. One standard spacing within a rack is set by a DIN standard at (1 U=1.75 inches=44.5 mm). Heat transfer and other considerations often dictate that a dedicated space exist between components to facilitate air to flow for convective cooling. Spaces also exist for clearance purposes or to permit equipment to be changed or serviced. Thus, an assemblage of modules in a rack leaves gaps between the modules, and these are typically covered using plates known as fascia covers.

Currently, a structural, foam molded fascia cover with a height of 16 U is used. Smaller sizes are created by cutting, removing sections of the 16 U cover and then splicing the remaining pieces together using steel channels. Existing fascia covers are thus extremely expensive and require a labor-intensive effort to fabricate a cover to a specific opening size. The existing covers do, however, provide an aesthetically acceptable appearance to the finished system. It would be desirable to reduce the cost of fascia covers without compromising the integrity or aesthetic appearance of these components. Accordingly, it is an objective of the present invention to provide a low cost set of modular components that can be used to create fascia covers of various sizes.

The provision of a modular and easily changed instrument panel is disclosed in U.S. Pat. No. 3,035,446—Ross. The Ross patent discloses instrument panel covers that include easily removable sections that provide cut outs for various sized instruments that are inserted in the panel. Similarly, U.S. Pat. No. 4,079,838 discloses an instrument mounting panel that is divided into a number of smaller panel elements that can be broken away to adjust both the panel size, as well as the number and size of openings in the panel.

The use of fascia panels having removable sections is known in the design of the housings of personal computers and similar devices. For example, U.S. Pat. No. 5,327,683—Chu discloses a front panel comprised of a frame and two wall units. The wall units fill in the space between the disk drive openings and the like that are found in a personal computer front panel. A similar concept is disclosed in U.S. Pat. No. 5,235,493—Yu, which shows a personal computer front panel comprised of component panels that can be oriented either horizontally or vertically.

There remains, however, a need for a fascia panel assembly that can be adapted to fit in openings of various sizes. In particular, there exists a need for a fascia panel that can cooperate with the structure of a standardized rack used for mounting computer and electronic components.

SUMMARY OF THE INVENTION

The present invention provides a fascia cover assembly for systems of rack-mounted components. In preferred embodiments, the facia cover assembly of the present invention is comprised of a relatively simple frame carrier, preferably fabricated as a sheet metal stamping, to which one or more modular components are attached. The components are preferably molded components of a standardized height, and by creating carriers in appropriate sizes and snapping into place the appropriate number of molded components, various size fascia cover assemblies are easily created. In a preferred embodiment, the present invention provides a modular panel that has a height of 1 U (1 U=1.75 inches=44.5 mm). In certain embodiments, a molded panel that is 3 U high is also used. In a most preferred embodiment, an operator panel, that is 1.5 U high is placed at the top of the fascia cover assembly and a pull bar that is 0.5 U high is disposed at the bottom. Thus, one preferred basic fascia cover assembly is 3 U high. In certain preferred embodiments, the assembly is affixed to a rack using spring clips that are also affixed to the frame carrier.

The present invention reduces the fascia costs by as much as 75% by using a high volume of molded parts. By making the assembly from a series of modular components, the present invention provides an advantage in that no scrap is created. Additionally, the sheet metal carrier used in conjunction with the molded parts allows flexibility to create other fascia covers without tooling additional molded parts.

BRIEF DESCRIPTION OF THE DRAWINGS

FIG. 1 is a perspective view of the rear of a fascia assembly made in accordance with the present invention;

FIG. 2 is a perspective view of the front of the fascia assembly illustrated in FIG. 1;

FIG. 3 is a perspective view of a frame carrier used with the fascia assembly illustrated in FIGS. 1–2;

FIG. 4 is a perspective view of the rear of another embodiment of a fascia assembly made in accordance with the present invention;

FIG. 5 is a perspective view of the front of the fascia assembly illustrated in FIG. 4;

FIG. 6 is a perspective view of a frame carrier used with the fascia assembly illustrated in FIGS. 4–5;

FIG. 7 is a perspective view of an operator panel used in conjunction with the present invention;

FIG. 8 is a perspective view of a snap in fascia panel used in conjunction with the present invention;

FIG. 9 is a perspective view of a pull bar used in conjunction with the present invention;

FIG. 10 is a perspective view of a spring clip used in conjunction with the present invention; and FIG. 11 is a side elevation view of the spring clip illustrated in FIG. 10.

DETAILED DESCRIPTION OF THE PREFERRED EMBODIMENTS

Referring now to FIG. 1, a first embodiment of a fascia cover assembly 100 made in accordance with the present invention is illustrated. A rear view of the fascia cover assembly 100 is shown in FIG. 2. The assembly 100 is comprised of a cover panel 102, an operator panel 104 and a pull bar 106. Together, these three components cover the entire front surface of the assembly 100 and are designed, as illustrated, to create the appearance of a continuous and decorative fascia cover. Referring to FIG. 2, it can be seen that the cover panel 102, operator panel 104 and pull bar 106 are all affixed to a frame carrier 110. The frame carrier 110 is further illustrated in FIG. 5 and is typically fabricated from a single sheet metal stamping. The frame carrier 110 has a series of openings or other features 111 that cooperate with corresponding features on the cover panel 102, operator panel 104 and pull bar 106 to attach these components to the frame carrier 110.

The frame carrier 110 also has one or more slots 112 through which attachment devices can be inserted to affix the assembly to a rack or other structure that forms part of the next higher assembly. In a most preferred embodiment of the present invention, the slots 112 are constructed to accept specially designed spring clips, as explained below with reference to FIGS. 10–11.

The fascia cover assembly 100 illustrated in FIGS. 1–2 is 8.6 inches (218 mm) high and 19.00 inches (483 mm) wide, and the slot cow, red by the fascia assembly 100 is a 5 U high slot. These dimensions are preferably achieved using a cover panel 102 that is 3 U high, an operator panel 104 that is 1.5 U high and a pull bar 106 that is 0.5 U high, which adds up to a 5 U high assembly. It will be noted that the actual dimensions are not precisely equal to the 5 U spacing dimension of 8.75 inches (222 mm). The 5 U dimension is the standardized rack spacing height, whereas the precise fascia cover dimension is less because the components mounted in the rack include a spacing tolerance and, in some instances, a dedicated space is required between components. Small gaps created by these differences can be sealed with gaskets. Those of ordinary skill will therefore understand that the actual dimensions of the fascia covers will, in certain instances, need to be adjusted from the exact standardized height unit dimension, however, such adjustments can be readily made by appropriate layouts and measurements, without resort to undue experimentation.

As used herein, the term "standardized height unit" is meant to refer broadly to a unit of spacing within a rack, typically the 1 U DIN standard. However, the modular concept of the invention described herein is readily used with any standardized dimension of spacing within a rack or similar structure.

A fascia cover assembly 200 similar to that illustrated with reference to FIGS. 1–3 is shown in FIGS. 4–6. In these and the remaining figures, like reference numerals will indicate like features or structures. In the embodiment illustrated in FIGS. 4–6 the height of the fascia cover assembly 200 is about 7.00 inches and thus covers a slot that is 4 U high. In this embodiment, as seen in FIGS. 4–5, the assembly 200 is comprised of two cover panels 202, and an operator panel 104 and a pull bar 106 the latter two components preferably being identical to the components used in the embodiment illustrated in FIGS. 1–2. As seen in FIG. 5 and further illustrated in FIG. 6, a 4 U frame carrier 210 is utilized to mount the two cover panels 202, operator panel 104 and pull bar 106. Openings or other features 111 are again supplied for this purpose, as explained above. The 4 U frame carrier 210 also has slots 112 for accepting spring clips or other hardware that will attach the fascia cover assembly 200 to a rack or other structure.

The 4 U height of the assembly 200 illustrated in FIGS. 4–6 is thus achieved by using four modular components. As explained above, the operator panel 104 and pull bar 106 are, respectively, 1.5 U and 0.5 U high, and the two cover panels 202 are intended to cover an opening that is 1 U high. Perspective views of the operator panel 104, pull bar 106 and the cover panel 202 used in the embodiment of the fascia assembly 200 illustrated in FIGS. 4–5 are illustrated, respectively, in FIGS. 7–9. FIG. 7 illustrates a rear view of the 1 U cover panel 202 shown as part of the fascia cover assembly 200 illustrated in FIGS. 4–6. The locking tabs 204 and posts 206 that cooperate with openings in the frame carrier in preferred embodiments to lock the panel to the frame carrier are seen in this view. FIG. 8 illustrates a rear view of the operator panel 102 that is seen at the top of the assemblies illustrated in FIG. 1 and FIG. 4. This modular component also includes locking tabs 204 and posts 206 such as those illustrated in FIG. 7. Finally, a rear view of the pull bar 106 shown in FIGS. 1 and 4 is shown in FIG. 9. The pull bar 106 is preferably attached to a frame carrier using fasteners that extend through holes 208. The pull bar 106 is used to dismount the fascia panel assembly from the rack when the rack components are being added or removed, or when access is otherwise required and is most preferably an aluminum extrusion.

The three modular components illustrated in FIGS. 7–9, in conjunction with the 3 U panel 102 illustrated in FIGS. 1–2, permit fascia cover assemblies of any selected height to be created. Although cover panels can be made in any combination of heights, it is preferred to use combinations of 3 U and 1 U panels to cover a slot of any given height. Preferably, each fascia cover assembly also comprises a 1.5 U operator panel at the top and a 0.5 U pull bar at the bottom. For each slot height, a frame carrier such as those illustrated in FIGS. 3 and 6 is easily fabricated since it is preferably a sheet metal stamping.

As explained above, the assembly of the modular panels and the frame carrier described above is most preferably retained in a rack using spring clips, a preferred embodiment of which is illustrated in FIGS. 10–11. The clip 300 most preferably comprises a frame carrier retention portion 310 and a rack engaging portion 320. In use, the clip 300 is most preferably first affixed to the frame carrier, as seen in FIGS. 3 and 6. The fascia cover assemblies 100,200 described above can then be removably snapped into a rack, and the rack engaging portion releasably locks the assembly in place.

Although certain embodiments of the present invention have been described above with particularity, these embodiments are meant to illustrate the invention and are not meant to limit its scope. Upon review of the foregoing specification, those of skill in the art will realize many adaptations, modifications and variation of the components described above that utilize the present invention while departing from the specific design illustrated. For example, the size and aspect ratios of the panels can be readily varied, as well as their ornamental design. The dimensions of the operator panel and pull bar can also be changed. Similarly, the frame carriers can be designed differently and of different materials, including plastic, yet still support the facia panels as described. Finally, the spring clips may in certain embodiments be dispensed with altogether by forming integral attachment member as part of the panels, frame carriers or both. The design of such integral fasteners is well known in the art, and would include, for example, edge features, i.e., sliding grooves, in addition to "post-and-hole" type fasteners. Alternatively, screws, rivets or other conventional fasteners may be used to attach the panels to the frames and the assemblies to the racks. Thus, reference should be made to the appended claims in order to ascertain the full scope of the present invention.

What is claimed is:

1. A fascia assembly comprising one or more modular panels selected from a limited set of panel heights and affixed to a frame carrier, wherein the fascia assembly completely covers an opening in a rack by attaching the frame carrier to the rack, wherein each of the limited set of panel heights is a whole number multiple of a standardized unit of height.

2. The fascia assembly of claim 1, wherein each modular panel is of a height that covers an opening that is a whole number multiple of a standardized unit of height.

3. The fascia assembly of claim 2, wherein at least one of the modular panels is of a height covers an opening that is three times the standardized unit of height.

4. The fascia assembly of claim 1, wherein one of the modular panels comprises an operator panel.

5. The fascia assembly of claim 4 wherein the operator panel is of a height that covers an opening equal to one and one-half units of the standardized unit of height.

6. The fascia assembly of claim 1, wherein one of the modular panels comprises a pull bar.

7. The fascia assembly of claim 6 wherein the pull bar is of a height that covers an opening equal to one-half unit of the standardized unit of height.

8. The fascia assembly of claim 1, wherein at least one of the modular panels is comprised of molded plastic.

9. The fascia assembly of claim 1, wherein the frame carrier is comprised of sheet metal.

10. The fascia assembly of claim 9 wherein the frame carrier comprises a modular panel locking feature and a rack mounting feature.

11. The fascia assembly of claim 10 wherein the modular panel locking feature comprises holes for accepting a protruding element in locking engagement.

12. The fascia assembly of claim 10, wherein the rack mounting feature comprises a slot for accepting a spring clip.

13. The fascia assembly of claim 12, further comprising one or more spring clips affixed to the frame carrier for engaging the rack to removably lock the fascia assembly in place.

14. A system comprising:

one or more components mounted in a rack having an opening between components and extending across the width of the rack; and a fascia assembly completely covering the opening, the fascia assembly comprising one or more modular panels affixed to a frame carrier, at least one of the panels having a height sufficient to cover an opening equal to one standardized height unit.

15. The system of claim 14, wherein at least one of the modular panels is of a height that is three times the standardized height unit.

16. The system of claim 14, wherein at least one of the modular panels is an operator panel.

17. The system of claim 14, wherein at least one of the modular panels is a pull bar.

18. The system of claim 14, further comprising one or more spring clips affixed to the frame carrier for engaging the rack and removably locking the fascia assembly in place.

19. A fascia assembly comprising one or more modular panels selected from a limited set of panel heights affixed to a frame carrier, wherein the frame carrier comprises a modular panel locking feature and a rack mounting feature, an wherein each of the limited set of panel heights is a whole number multiple of a standardized unit of height.

* * * * *